(No Model.) 2 Sheets—Sheet 1.
D. B. HASELTON.
COTTON GIN.
No. 395,230. Patented Dec. 25, 1888.
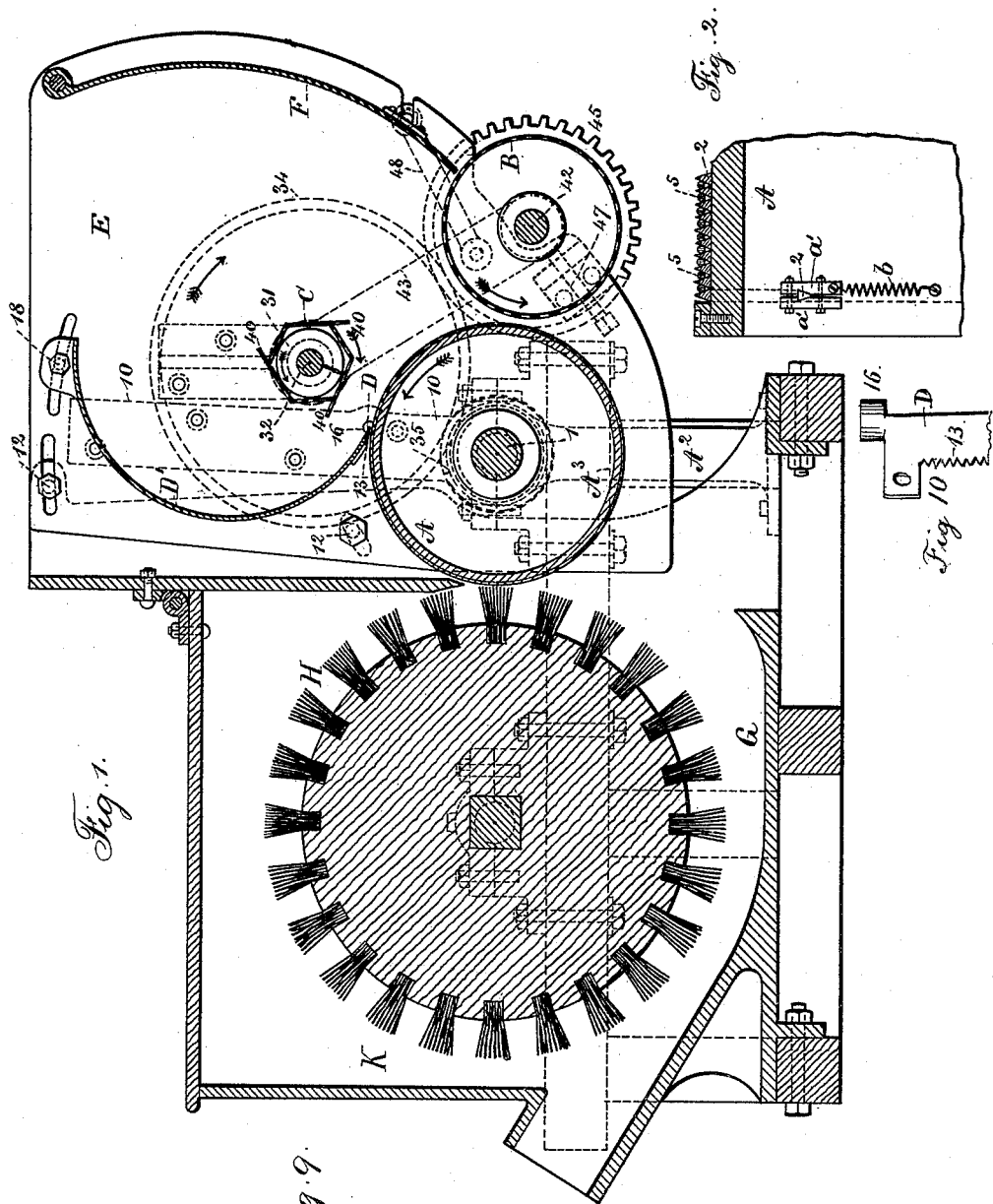
Witnesses
J. Staib
Chos H Smith
Inventor:
Daniel B. Haselton
per Lemuel W. Serrell Atty
N. PETERS. Photo-Lithographer, Washington, D. C.

(No Model.) 2 Sheets—Sheet 2.
D. B. HASELTON.
COTTON GIN.
No. 395,230. Patented Dec. 25, 1888.
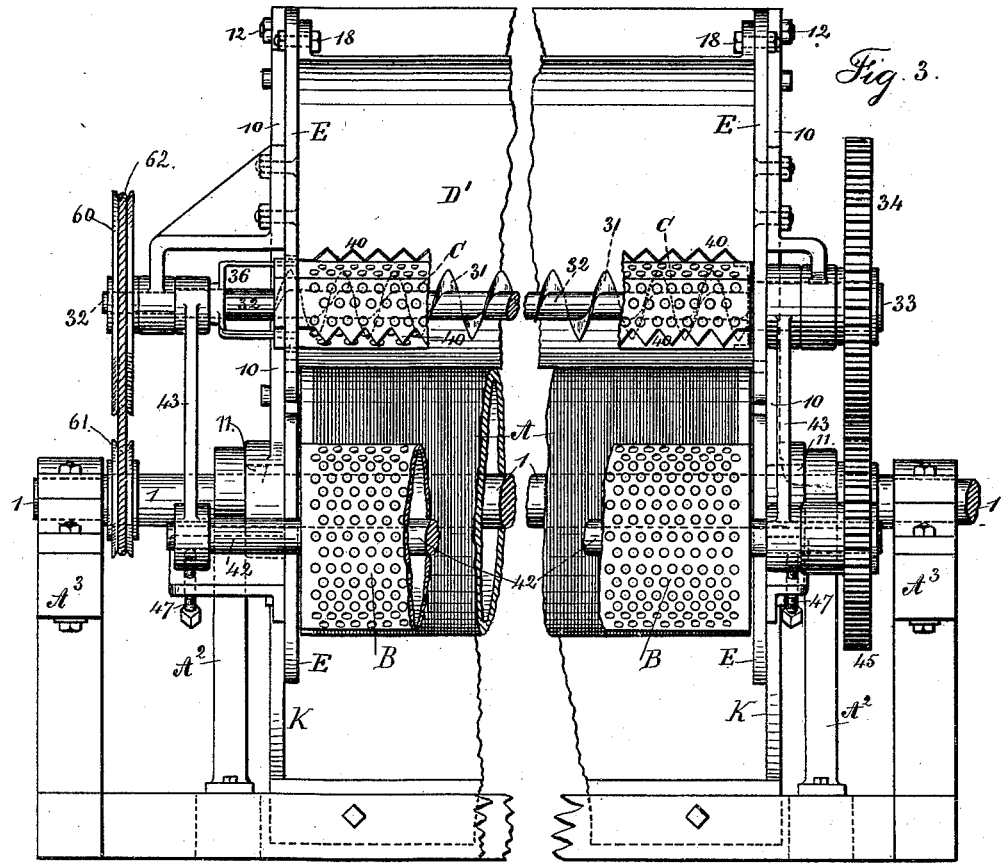
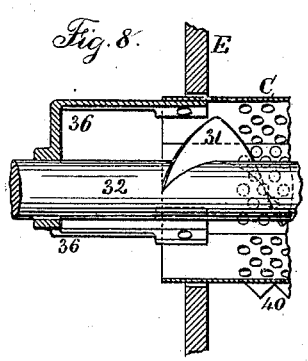
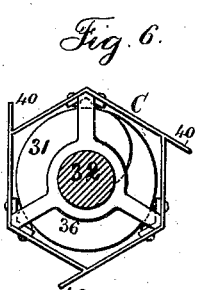
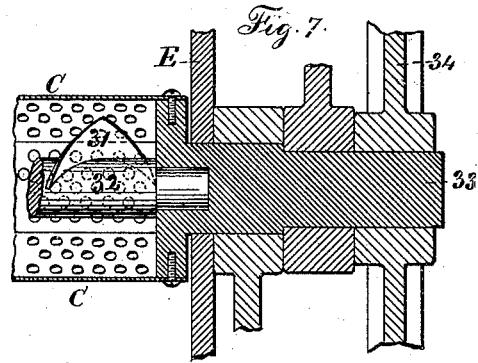
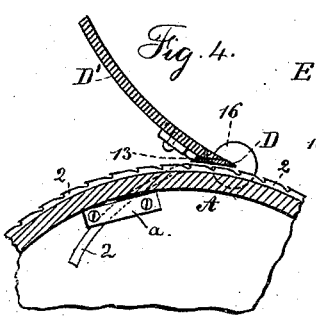
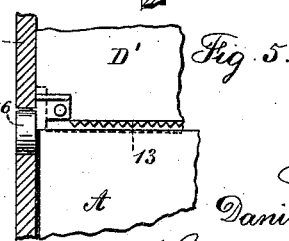
Witnesses:
J. Stail
Chas H Smith
Inventor:
Daniel B. Haselton
per Lemuel W. Serrell
Atty

UNITED STATES PATENT OFFICE.

DANIEL B. HASELTON, OF CHARLESTON, SOUTH CAROLINA.

COTTON-GIN.

SPECIFICATION forming part of Letters Patent No. 395,230, dated December 25, 1888.

Application filed September 20, 1886. Serial No. 213,989. (No model.)

*To all whom it may concern:*

Be it known that I, DANIEL B. HASELTON, of Charleston, in the State of South Carolina, have invented an Improvement in Cotton-Gins, of which the following is a specification.

In ginning cotton in the ordinary saw-gin the clothing of the attendant is sometimes drawn in below the cylinder of saws and injury results therefrom, and the points of the teeth, standing outwardly, sometimes engage foreign substances—such as gravel, nails, matches, &c.—causing injury to the teeth, delay, or fire, and the seeds are not always entirely stripped. Besides this, the roll of cotton in the breast or hopper sometimes becomes so filled with seeds that it breaks and the seeds fall into the lower part of the breast, choking the machine and rendering it necessary to stop and remove the seeds by hand.

My present improvements are for overcoming the objections which I have practically experienced.

I make the ginning-cylinder so that it contains a much larger number of teeth in the same area of surface than in the ordinary saw-gin, so that the cotton is less liable to be cut, because the fiber attached to each seed is held by a larger number of teeth and the strain on the fiber is distributed. The seeds are pressed to the ginning-cylinder by a seed-screen, which promotes the free delivery of the clean seeds and prevents those not fully denuded of lint from passing through, but throws them again in contact with the teeth. In the hopper or breast I place a roll-screen that receives and conveys away the clean seeds from the middle of the roll, and at the same time it acts to press the hollow roll of cotton to the ginning-teeth, and also by its forward inclined teeth breaks up any accumulation of the stock at the edge of the seed-bar. The breast and parts carried by it are adjustable to adapt the machine to the cotton or the dry or moist condition of the same.

In the drawings, Figure 1 is a vertical central section of the gin. Fig. 2 is a sectional view, in larger size, of the ginning-cylinder at one end. Fig. 3 is an elevation at the feeding end of the gin, the parts being shown as broken open in the middle and the breast-shield removed. Fig. 4 is a detached section showing some of the teeth of the ginning-cylinder and part of the seed-bar and part of the concave. Fig. 5 is a section showing part of the rear of the seed-bar and concave. Fig. 6 is an end view of the roll-screen. Fig. 7 is a longitudinal section at one end, and Fig. 8 is a longitudinal section at the other end, of the roll-screen in larger size. Fig. 9 is a section of the support for the ginning-shaft and the movable breast. Fig. 10 is a plan of the seed-bar at one end in larger size.

The ginning-cylinder A is made of either wood or metal, preferably the latter, and hollow, as shown. The shaft 1 is supported in suitable bearings upon standards $A^2 A^3$. The teeth are made in one edge of a triangular wire, 2, that is wound around the cylinder, such teeth being undercut in one angle or edge of the wire, and the point of each tooth is slightly depressed below the circumferential line of the wire, so as not to catch into foreign substances—such as the pods, seeds, corncobs, stones, &c.—that sometimes are carelessly fed into the hopper or breast.

In winding the wire 2 upon the cylinder it is preferable to pass one end into and through a slanting hole in the cylinder near the end and apply to the same a clamp, $a$, formed of two pieces of metal with a screw or screws, and having grooves in the faces, so as to receive the triangular wire and firmly grasp the same, and this clamp is drawn up against the inner surface of the cylinder. In winding the toothed wire the base of the wire rests on the cylinder, and the convolutions are brought close together, as seen in Fig. 2, and the extreme end of the wire is passed through a diagonal hole in the cylinder, and a second clamp, $a'$, is applied thereto, and a contractile spring, $b$, between the clamp and the interior of the cylinder applies a tension to the wire, the object being to take up any slack or any stretching that may result from use, as the stationary clamp $a$ is to be at the end of the wire toward which the teeth are pointed, and hence the cotton acting against the teeth will tend to tighten the wire helix and bring any slack to the end where the clamp $a'$ and the spring $b$ are applied. I also make use of a helical winding of comparatively fine wire, as at 5, between the coils of wire containing the teeth, such wire 5 preventing the toothed wire from moving laterally and limiting the distance that the cotton can be pressed into the spaces between the teeth, thus making the cylinder very reliable. The teeth in the wire are small and close together, so that the largest possible number of teeth to the square inch may be obtained in order that the power required to draw the cotton along, while the seeds are kept back, may be applied to a large extent of surface and the cotton be protected from injury due to the cutting of the fiber upon the few teeth, in the ordinary saw-gin, that enter each lock or boll of cotton.

The brush H for removing the cotton from the ginning-cylinder is of ordinary construction. It is within the blower-case K and above the mote-board G, and is operated in the usual way.

The ends of the wire 5 may be passed through holes in the cylinder and secured in the same manner as the ends of the wire 2; or any other suitable fastening may be used.

The cheek-pieces E form the ends of the breast or hopper and the shield F the front of such breast. The end pieces, E, are connected to straps 10, having eyes at their lower ends, which pass over the tubular sleeves 11, extending out laterally from the standards $A^2$, and through which sleeves the cylinder-shaft 1 passes, so that the breast will be supported by the sleeves 11, and can be swung thereon, so that the parts carried by the breast can be moved to the desired position in relation to the ginning-cylinder. The ends or cheeks E lap upon the ends of the blower-case, and are held by screws 12, passing through slots.

The roll-screen C, the seed-bar D, and the concave D' are connected with the cheeks E and move with them when such cheeks are adjusted, and the object of the adjustment is to bring the edge of the seed-bar and the seed-screen to the proper positions over the ginning-cylinder for causing them to operate upon the seed cotton to the best advantage, because, if, the hollow roll of cotton and seeds as it is revolved around in the breast has a tendency to approach too near the front or shield F, the breast is swung backwardly, and the reverse if the hollow roll of cotton and seeds is too far from the shield; but, as the axis of the ginning-cylinder is the center on which the breast is swung, the roll-screen and seed-bar are kept at the proper distance from the teeth of the ginning-cylinder.

The seed-bar D is set sufficiently close to the ginning-cylinder to prevent cotton-seeds, motes, &c., passing beneath the same; but the cotton is drawn through beneath by the teeth of the cylinder. It often would happen, however, that a lock of cotton partially carried away from the seeds, but still adhering to them, the seeds being carried up and away from the seed-bar, would be pulled back beneath the seed-bar. To prevent this I place a row of teeth, 13, at the back edge of the seed-bar, so that the cotton expanding as it passes under the seed-bar is caught by such teeth, and, instead of being pulled back beneath the seed-bar, it is held and the seeds are pressed off with a rolling motion and carried away, and the cotton is delivered by the action of the ginning-cylinder.

The seed-bar is supported at its ends by the cheek-pieces E, and to connect the parts I provide circular bearings or trunnions 16 at the ends of the seed-bar, entering round holes in the cheek-pieces E, and the centers of these trunnions are in line with the front edge of the seed-bar, so that this edge of the seed-bar will occupy a fixed position in regard to the ginning-cylinder; but the concave D', to which is attached the seed-bar, may be swung at its upper edge and clamped by the bolts 18, passing through slots in the cheek-pieces E, without throwing the seed-bar out of adjustment.

The object in swinging the concave D' is to adjust its action upon the hollow roll of cotton and seed that is constantly revolving within the hopper or breast as the ginning progresses, so that such hollow roll of cotton may be in the proper position and maintain its proper shape, the object being to remove the lint from the seeds with a rolling pull, due to the roll of cotton traveling against the upper part of the lock or boll of cotton that is engaged by the teeth and stopped by the seed-bar, instead of the straight pull of the ordinary saw-gin.

In the ginning operation the mass of cotton and seeds forms a horizontal hollow roll, which is revolved by the action of the ginning-teeth upon the bottom part of said roll. The tendency of the seeds is to work inwardly as fast as they are stripped, so that the mass of seeds becomes too great to be held together by the surrounding cotton, and when the roll ceases to revolve it falls apart and the seeds drop and remain inert, clogging up the machine. Efforts have been made to prevent this difficulty by a roll of radial spikes within the roll of cotton, but the same is not reliable and the spikes interfere with the proper movements of the roll of cotton.

In my present invention the roll-screen C occupies the space within the hollow roll of cotton and seed, and it is revolved at about the same surface speed as that of the roll by any suitable gearing or belts, and it is preferably made of sheet metal, with numerous holes in it that are sufficiently large for the cleaned cotton-seed to fall freely through into the interior of the screen, from which they are conveyed by the spiral blade 31 on the shaft 32, revolved within the screen C by gearing or belts. I have shown the screen as attached at one end to a hub and short shaft, 33, to which the power to revolve the screen is applied by the gear-wheel 34 and pinion 35 upon the cylinder-shaft, and at the other end of the screen there are arms and a hub, 36, through which the shaft 32 passes, and said shaft at its inner end is received into an opening in the hub 33. The pulleys 60 and 61 and belt 62 are shown for driving the shaft 32 from the shaft 1. By this means the roll-screen and the screw-conveyer within the same are revolved at the proper speed and the cotton-seeds are discharged from the open end of the cylinder between the arms.

I prefer to make the roll-screen prismatic, and to extend the sheet metal at the angles of the prism in the form of rows of teeth 40, which point in the direction in which the hollow roll of cotton and seeds is revolving, so as not to check its motion or break up the adhesion of the cotton in such roll; but the screen and teeth are moving in the same direction as the roll of cotton and at about the same speed; hence the teeth move the cotton onward and prevent it being stopped at the contracted opening between the screen, the ginning-cylinder, and the seed-bar, and the space between the screen and the concave D' widens upwardly, so that the roll is permitted to expand as it passes beyond the ginning-point and the seeds are projected upwardly and are free to fall upon the roll-screen, and also to pass around with the rest of the roll and fall upon the seed-screen B. This seed-screen B is of metal, with openings or perforations large enough for the cleaned seeds to fall freely through either surface, and is mounted upon a shaft, 42, which has its bearings in the links 43, which have eyes at their upper ends surrounding one the shaft 32 and the other the shaft 33, and said screen is represented as driven by the gear-wheel 45 from the wheel 34, and the downward swinging movement is limited by the screws 47, that act against the under sides of the links near their ends, and thereby determine the proximity of the screen to the ginning-cylinder. This screen is revolved in the same direction as the ginning-cylinder and carries the seeds down between the ginning-cylinder and itself, and any seeds that are not clean are caught by the teeth of the ginning-cylinder and carried up to be acted upon again, and all the seeds that are clean pass away between the seed-screen B and the ginning-cylinder or through the openings in such seed-screen. This seed-screen can be swung forward upon the link-bearings to allow any masses of seeds or foreign substances to fall between the seed-screen and the ginning-cylinder, and by connecting the front or shield F of the breast with the links 43 by the links 48 at the ends the shield F will be swung out of the way of the seed-screen as the latter is moved away from the ginning-cylinder.

The roll-screen C revolves sufficiently near the ginning-cylinder to press the seed-cotton against it and compel engagement of the fibers or lint with the ginning-teeth.

I do not claim a triangular wire having teeth for a cotton-gin cylinder, nor a round wire wound between the convolutions of a flanged wire with teeth. In my improvement the triangular wire is wound with the edges of the base close together, so that the small round wire will wedge tightly in between the inclined surfaces of the triangular wire to prevent the cotton fibers passing in between the metal surfaces, and the round wire, not touching the surface of the cylinder, will be tightly wedged between the inclined surfaces of the triangular wire by the pressure of the cotton in ginning, and should any looseness or slack occur in the wire it can be drawn up and the end resecured in any convenient manner.

I claim as my invention—

1. A ginning-cylinder formed of a plain cylinder, a triangular wire having undercut teeth in one edge and wound upon the cylinder with the edges of the bases close together, and a round wire wound tightly between the inclined surfaces of the triangular wire and not touching the plain cylinder, so as to be firmly held in place, the ends of the wires being secured to the cylinder, substantially as set forth.

2. A cotton-gin cylinder formed of a plain cylinder having a wire with teeth cut therein and wound closely upon the cylinder and the ends passed through holes in such cylinder, in combination with a clamp and a spring applied at one end of the wire, substantially as set forth.

3. The combination, with the ginning-cylinder and the hopper, of a seed-screen forming a guard in front of the ginning-cylinder and below the hopper and having numerous holes of a size to allow the cleaned cotton-seeds to pass through, and inclined links pivoted at their upper ends and receiving through their lower ends the shaft of the seed-screen for suspending such seed-screen, so that it may be kept toward the ginning-cylinder by gravity, but will swing away from the same to allow masses of seeds to pass down, substantially as set forth.

4. The combination, with the ginning-cylinder, of a seed-bar having trunnions at its ends, a concave connected thereto and extending above the seed-bar, and a hopper with cheek-pieces at the ends, having slots and clamping-screws for holding the concave after being adjusted, substantially as set forth.

5. The combination, with the ginning-cylinder and its shaft, of a concave over the cylinder, a hopper with cheek-pieces forming the ends, the straps 10, and tubular sleeves upon which the cheeks can be turned in adjusting the position of the parts, and the clamping-bolts to hold the same, substantially as set forth.

6. The combination, with the ginning-cylinder, the seed-bar and concave above the same, and the hopper having cheeks forming the ends thereof, of a hollow metallic roll-screen having holes in it of a size to allow the cleaned cotton-seeds to pass into the same, substantially as specified.

7. The combination, with the ginning-cylinder and the seed-bar and concave above the same, and the hopper having cheeks forming the ends thereof, of a hollow metallic roll-screen having holes in it of a size to allow the cleaned cotton-seeds to pass in, and rows of teeth on the exterior of the roll-screen, substantially as specified.

8. The combination, with the ginning-cylinder, of a seed-bar, a concave above the same, and a hollow perforated roll-screen above the ginning-cylinder and near the concave at its lower edge, said roll-screen having ranges of teeth upon the same, and the distance between the concave and roll-screen increasing upwardly, substantially as and for the purposes set forth.

Signed by me this 13th day of September, A. D. 1886.

DANIEL B. HASELTON.

Witnesses:
A. H. MORTON,
FRANK ALLEN.